United States Patent
Rausing

[11] 3,848,760
[45] Nov. 19, 1974

[54] PACKING CONTAINER
[75] Inventor: Hans Anders Rausing, Lund, Sweden
[73] Assignee: Sobrefina SA, Fribourg, Switzerland
[22] Filed: Dec. 8, 1972
[21] Appl. No.: 313,413

[30] Foreign Application Priority Data
Dec. 30, 1971 Sweden.............................. 16883/71

[52] U.S. Cl. ................................ 215/12, 229/14 B
[51] Int. Cl............................................ B65d 11/16
[58] Field of Search............... 215/12, 13; 229/14 B; 150/.5; 222/183

[56] References Cited
UNITED STATES PATENTS
3,288,340  11/1966  Shapiro................................. 150/.5
3,633,780  1/1972   Rausing............................. 215/12 R
3,666,163  5/1972   Ignell................................. 229/14 B
3,737,092  6/1973   Rausing............................. 229/14 B Primary Examiner—Herbert F. Ross
Attorney, Agent, or Firm—Pierce, Scheffler & Parker

[57] ABSTRACT

One form of packing container comprises a relatively thin, inner lining (consisting of a dished or concave base, a cylindrical mid-part and a conical top) of a plastic material and a mechanically rigid outer supporting shell, into which latter the cylindrical part of the lining tightly fits. The transition between conical top and cylindrical mid-part of the lining has a projecting annular edge which slopes downwardly from the cylindrical mid-part so that the lower edge of the conical top is somewhat lower than the upper edge of the cylindrical mid-part.

4 Claims, 2 Drawing Figures

PATENTED NOV 19 1974      3,848,760
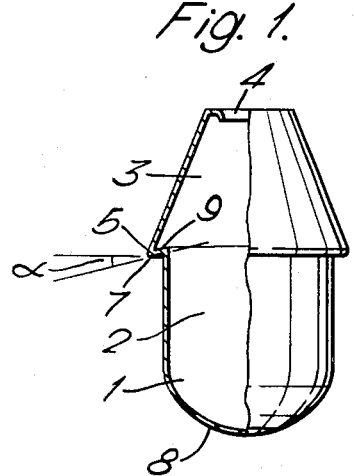
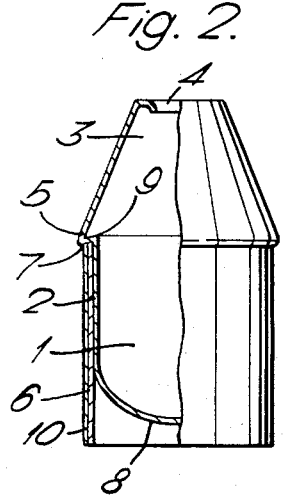

PACKING CONTAINER

The present invention relates to a packing container of the type which comprises on the one hand a thin, inner lining of plastic material which lining consists of a dished or concave base part, a cylindrical middle part and a conical top part, and on the other hand, an outer supporting shell of a mechanically rigid material, e.g., cardboard or the like, which supporting shell is adapted so that it connects with a tight fit to the cylindrical part of the lining.

It is known that in the technique of packaging, packing containers are used which consist of a thin inner plastic lining and an outer supporting shell, which supports a central cylindrical part of the plastic lining whilst on the other hand the top part and the base part have been given such a geometrical shape, that any stresses arising in the said parts do not appreciably deform the plastic material. These known packing containers have an inner plastic lining which is manufactured in two parts, namely an upper part which consists of the conical top and a lower part which consists of a cylindrical part which terminates in a dished base part. The upper conical part ends in a flange and the cylindrical part does likewise, and the said flanges are adapted so that they can be assembled and joined to one another by heat sealing or welding to form a lining. The said welding flanges are made use of in such a manner that they form a ledge against the upper edge of the outer supporting shell and cover the section surface of the supporting shell and protect in this manner the said section surface from coming into contact with the liquid contents which may flow along the upper part of the packing container when the contents are poured out.

The method of manufacturing the lining of the packing container as two separate parts which are later joined together by welding has certain inconveniences, since it requires a relatively complicated production machinery. This method can only be considered therefore when it is a matter of manufacturing a large member of packing containers, whilst the manufacture of a smaller member cannot be performed economically with the above-mentioned expensive and complicated machinery.

In packing containers in accordance with the invention it is suggested that the inner plastic lining should be made in one piece in that a conventional blowing procedure is used where a tubular blank of plastic material is heated up to softening temperature and introduced into a blow mould, in which the tubing is blown up so that the plastic material is expanded and is made by means of compressed air to assume the shape of the moulding cavity. This method of manutacture is a little slower than the deep-drawing process which is applied to the manufacture of the separate parts of the lining which are later assembled, but for the manufacture of smaller series of packing containers the method is economical. It has also been found that it is possible by application of the blowing process to obtain a packing container which presents certain advantages over the earlier known type of packing container, where the inner lining is manufactured in two parts. Such an advantage is, e.g., that the transition between the top part of the lining and its cylindrical middle part can be moulded in such a manner that any risk of the liquid contents coming into contact with the upper edge of the outer shell can be avoided.

The packing container in accordance with the invention is characterized in that the transition between the cylindrical middle part and its conical top part has a projecting, annular or flange-like edge part which somewhat slopes downwards from the cylindrical middle part, so that the lower edge of the conical top part will be located a little lower than the upper edge of the cylindrical middle part, and that the said supporting shell is adapted so that it rests with its upper edge against the said projecting edge part.

In the following the invention will be described with reference to the enclosed schematic drawing, in which FIG. 1 shows a lining partly in cross-section, and
FIG. 2 shows a finished packing container partly in cross-section.

The blown packing lining 1 shown in FIG. 1 consists of a top part 3 which comprises a pouring opening 4 in which it is intended to fit a cap after the filling of the packing container. In the embodiment shown here the top part 3 is shaped as a conical part which at the bottom 7 passes into a transition zone 5, which connects the top part 3 to a cylindrical central part 2, which in its lower part has a dished base 8. As mentioned above the lining 1 is made by a blowing process, which implies that a piece of an end-sealed tube of plastic material is softened by heating, whereupon the said tube is blown up in a blowing cavity so that the plastic material is expanded and is made accurately to assume the shape of the moulding cavity. To obtain a lining of uniform thickness or a lining with a certain desired thickness distribution, the heating of the tubular blank can be controlled in such a manner that it is heated most at the places where the greatest expansion of the plastic material is desired and consequently the thinnest wall portion of the lining, or also, taking into consideration the form of the lining, heat up the tube blank in such a manner that a lining of uniform thickness is obtained, which is not the case if the tube blank is heated up uniformly, owing to the fact that the parts of the tube blanks which are intended to form the side and base portions of the lining are subjected to the greatest expansion unless a somewhat differentiated heating of the tube blank is provided.

The transition zone 5 is carried out so that it slightly slopes downwards from the upper edge 9 of the cylindrical part towards the lower edge 7 of the conical part 3. This implies that the lower edge 7 of the conical part 3 will be situated a little lower than the upper edge 9 of the cylindrical part 2, and any liquid which might flow over the surface of the conical part 3 in connection with the emptying of the package will thus not be able to penetrate underneath the edge 7 and moisten the underside of the transition zone 5. The angle $\alpha$ which designates the slope of the transition portion against the horizontal plane must be made relatively small, approximately 1°–5°, since the shape brings with it that the moulding tool for the lining obtains a so-called negative angle of clearance in the area of the transition zone. Such small negative angles of clearance as 1°–5°, however, cause no technical difficulties in production owing to the fact that the material of which the lining is made is somewhat elastic and flexible.

The finished packing container shown in FIG. 2 comprises beside the lining 1 also an outer shell 6 of, e.g., cardboard, which shell tightly encloses the cylindrical portion 2 of the lining 1. The outer shell 6 is so long that whilst resting with its upper edge against the lower surface of the transition zone 5 it projects with its lower edge a little past the dished base part 8 of the lining 1, so that it can constitute in known manner a foot for the packing container.

It may be suitable in certain cases to bevel the upper edge of the outer shell 6 so that it corresponds with the angle of slope of the transition zone 5, but in view of the small angle of slope it is not absolutely essential to provide the outer shell 6 with such a bevel.

When the finished package is to be used, the cap, not shown here, is taken off so that the pouring hole 4 is exposed. When the contents are emptied through the pouring opening 4 it is difficult to avoid that some part of the contents will flow over the outside of the conical part 3. Since the outer shell 6 can appropriately be made of cardboard the upper section surface of the shell will absorb liquid if it comes into contact with the same and so lose its mechanical stability. Through the shape of the transition zone 5 it is prevented, however, that the upper edge of the supporting shell 6 comes into contact with any liquid flowing along the outside of the conical portion 3, since such liquid will drip off at the edge 7 and possibly continue to flow down along the outside of the supporting shell 6, which can readily be made liquid-proof, however, by means of a surface layer 10 of metal foil or plastic.

I claim:

1. A packaging container comprising a plastic element having a substantially concave bottom portion, a cylindrical wall portion above said bottom portion and a conical top portion above the cylindrical wall portion, said bottom portion, wall portion and top portion being integrally formed, the bottom edge of the conical top portion having a greater diameter than the diameter of the top of the cylindrical wall portion and extending therebelow, and a sleeve member of substantially rigid cardboard-like material surrounding said cylindrical portion for supporting said cylindrical portion and maintaining the shape thereof and extending downwardly at least as far as the lowest portion of the concave bottom portion to serve as a base for the container, an integral flange-like annular portion extending from the top circumference of the cylindrical portion outwardly and downwardly to the lower circumferential edge of the conical top portion, the radial width of said flange-like annular portion being greater than the thickness of said sleeve member and the upper edge of said sleeve member engaging the lower surface of said flange-like annular portion to protect the sleeve from deterioration by any liquid which may contact the upper edge of said sleeve member when the contents of said container are poured therefrom.

2. A packaging container as claimed in claim 1 wherein the lower surface of the downwardly and outwardly extending annular portion forms an angle of from about 1°–5° with the horizontal.

3. A packaging container as claimed in claim 1 wherein the plastic element has a substantially uniform thickness throughout.

4. A packaging container as claimed in claim 1 and further comprising a non-absorbent coating on the outside of said sleeve member to further protect the sleeve from deterioration by any liquid which may contact said coating when the contents of said container are poured therefrom.

* * * * *